(12) United States Patent
Takato

(10) Patent No.: US 7,773,318 B2
(45) Date of Patent: Aug. 10, 2010

(54) OBJECTIVE OPTICAL SYSTEM FOR ENDOSCOPES

(75) Inventor: Hideyasu Takato, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 4 days.

(21) Appl. No.: 12/417,637

(22) Filed: Apr. 3, 2009

(65) Prior Publication Data
US 2010/0091388 A1    Apr. 15, 2010

(30) Foreign Application Priority Data
Apr. 4, 2008    (JP) .............................. 2008-098183

(51) Int. Cl.
G02B 9/06    (2006.01)
(52) U.S. Cl. .................................... 359/794
(58) Field of Classification Search ................ 359/793, 359/794; 348/65
See application file for complete search history.

(56) References Cited

U.S. PATENT DOCUMENTS

| 4,858,002 A * | 8/1989 | Zobel | 348/65 |
| 6,809,890 B2 * | 10/2004 | Do et al. | 359/793 |

FOREIGN PATENT DOCUMENTS

| JP | H02-069710 | 3/1990 |
| JP | H02-176612 | 7/1990 |
| JP | 2003-195158 | 7/2003 |
| JP | 2004-045978 | 2/2004 |
| JP | 2004-062014 | 2/2004 |
| JP | 2004-109591 | 4/2004 |
| WO | WO99/06866 | 2/1999 |

* cited by examiner

Primary Examiner—Alicia M Harrington
(74) Attorney, Agent, or Firm—Arnold International; Bruce Y. Arnold

(57) ABSTRACT

An objective optical system for endoscopes is characterized by comprising, in order from its object side, a stop, a first lens and a second lens. The first lens comprises a positive meniscus lens concave on its object side and the second lens comprises a positive lens convex on its object side. The following conditions (1), (2), (3) and (4) are satisfied:

$$-1.2 < r1/f < -0.8 \quad (1)$$

$$-1.0 < r2/f < -0.6 \quad (2)$$

$$2.1 < f2/f < 4.2 \quad (3)$$

$$nd1 > 1.65 \quad (4)$$

where r1 is the radius of curvature of the object-side surface of the first lens, r2 is the radius of curvature of the image-side surface of the first lens, f is the focal length of the whole optical system, f2 is the focal length of the second lens, and nd1 is the d-line refractive index of the first lens.

5 Claims, 5 Drawing Sheets

OBJECTIVE OPTICAL SYSTEM FOR ENDOSCOPES

This application claims benefit of Japanese Application No. 2008-098183 filed in Japan on Apr. 4, 2008, the contents of which are incorporated by this reference.

BACKGROUND OF THE INVENTION

The present invention relates to an objective optical system for endoscopes.

So far, there have been wide-angle optical systems used in consumer-oriented applications such as digital cameras (see Patent Publications 1 to 4), and optical systems used on endoscopes as well (see Patent Publications 5 and 6).

Patent Publication 1: JP(A)2004-109591
Patent Publication 2: JP(A)2004-62014
Patent Publication 3: JP(A)2004-45978
Patent Publication 4: JP(A)2003-195158
Patent Publication 5: JP(A)2-176612
Patent Publication 6: JP(A)2-69710
Patent Publication 7: PCT 99/6866

However, the optical systems set forth in Patent Publications 1 to 4 have not had an angle of view enough to be used on endoscopes, although having a wide-angle arrangement. The optical systems set forth in Patent Publication 5 or 7, albeit used in endoscope applications, have still been less compatible with CCDs having a lot more pixels, because of the occurrence of field curvature. Further, the optical system set forth in Patent Publication 6 has had an angle of view only par with that for consumer-oriented applications.

With such problems in mind, an object of the invention is to provide a small-format yet wide-angle objective optical system for endoscopes.

According to the invention, the aforesaid object is accomplishable by the provision of an objective optical system for endoscopes, which comprises, in order from an object side thereof, a stop, a first lens and a second lens, wherein the first lens comprises a positive meniscus lens concave on its object side and the second lens comprises a positive lens convex on its object side, with the satisfaction of the following conditions (1), (2), (3) and (4):

$$-1.2 < r1/f < -0.8 \quad (1)$$

$$-1.0 < r2/f < -0.6 \quad (2)$$

$$2.1 < f2/f < 4.2 \quad (3)$$

$$nd1 > 1.65 \quad (4)$$

where r1 is the radius of curvature of the object-side surface of the first lens,
r2 is the radius of curvature of the image-side surface of the first lens,
f is the focal length of the whole optical system,
f2 is the focal length of the second lens, and
nd1 is the d-line refractive index of the first lens.

Field curvature is quite well corrected by the satisfaction of conditions (1) to (4). It is then possible to be compatible with CCDs having a lot more pixels.

Condition (1) is concerned with the radius of curvature of the object-side surface of the first lens and the focal length of the whole optical system. As the lower limit of −1.2 to condition (1) is not reached, it causes under-correction of field curvature, rendering an image plane under. As the upper limit of −0.8 to condition (1) is exceeded, it causes overcorrection of field curvature, rendering the image plane over.

Condition (2) is concerned with the radius of curvature of the image-side surface of the first lens and the focal length of the whole optical system. If the range of condition (2) is satisfied, that is preferable because of being capable of making sure large angles of view and high image quality. As the lower limit of −1.0 to condition (2) is not reached, it fails to satisfy any wide-angle requirement. Exceeding the upper limit of −0.6 to condition (2) is not preferable because the image plane becomes minus with an increasing astigmatism. It also takes part in correction of chromatic aberrations, resulting in increases in both longitudinal chromatic aberration and chromatic aberration of magnification. In addition, it is not preferable in that there is a drop of the contrast of images with blurred colors.

Condition (3) is concerned with the focal length of the second lens and the focal length of the whole optical system. Being short of the lower limit of 2.1 to condition (3) causes undercorrection of field curvature, rendering the image plane under. Exceeding the upper limit of 4.2 to condition (3) causes astigmatism to grow large.

Condition (4) is concerned with the d-line refractive index of the first lens. Being short of the lower limit of 1.65 to condition (4) gives rise to overcorrection, rendering the image plane over.

It is also desired to satisfy the following conditions (5), (6), (7) and (8):

$$1.0 < r3/f < 1.8 \quad (5)$$

$$3.2 < lt/ih < 5.2 \quad (6)$$

$$5 < |v2-v1| < 35 \quad (7)$$

$$2w > 85° \quad (8)$$

where r3 is the radius of curvature the object-side surface of the second lens,
lt is the total lens length (from the first surface to the imaging plane),
ih is the maximum image height,
v1 is the Abbe constant of the first lens,
v2 is the Abbe constant of the second lens, and
2w is the maximum angle of view.

Condition (5) is concerned with the radius of curvature the object-side surface of the second lens and the focal length of the whole optical system. Abiding by the range of condition (5) is preferable because of being capable of making sure a back focus. Being short of the lower limit of 1.0 to condition (5) is not preferable because power grows too strong to take hold of any back focus, rendering the range of focusing narrow. Exceeding the upper limit of 1.8 to condition (5) causes the angle of oblique incidence of light on the CCD to grow tight, encountering difficulty making sure the quantity of rim light.

The optical system is located almost vertically to the direction of insertion of an endoscope's end. That vertical location makes it possible to shorten the total length, and is best fitted for an oblique or side view type objective, dispensing with members for changing the field of view such as a prism.

Condition (6) is concerned with the total lens length and the maximum image height. Exceeding the upper limit of 5.2 to condition (6) causes the total lens length to grow long, rendering layout difficult. Being short of the lower limit of 3.2 gets rid of space for receiving filters or the like, and renders lens fabrication difficult.

Condition (7) is concerned with the Abbe constant of the first lens and the Abbe constant of the second lens. Any deviation from the range of condition (7) gives rise to some considerable separations at the C- and F-lines, rendering color blurring conspicuous. Longitudinal chromatic aberration and chromatic aberration of magnification go worse too.

Condition (8) is concerned with the maximum angle of view. This is the minimum requirement for the angle of view for endoscopes required to have a wide-angle arrangement.

It is further desired to satisfy any one of the following conditions (9), (10) and (11):

$$1.3 < f2/f1 < 2.5 \tag{9}$$

$$0.37 < d1/f1 < 0.55 \tag{10}$$

$$0.12 < d2/f2 < 0.24 \tag{11}$$

where f1 is the focal length of the first lens,
d1 is the thickness of the first lens,
d2 is the thickness of the second lens, and
f2 is the focal length of the second lens.

Condition (9) is concerned with the focal length of the first lens and the focal length of the second lens, that is, the power rate between the first lens and the second lens. Being short of the lower limit of 1.3 to condition (9) causes the power of the first lens to become weak and so light rays on the second lens to grow high, resulting in an increase in the size of the whole lens system. Being in excess of the upper limit of 2.5 to condition (9) is not preferable, because the power of the first lens grows relatively strong; the bending of spherical aberrations grows large with an increasing field curvature.

Condition (10) is concerned with the thickness and focal length of the first lens. Being short of the lower limit of 0.37 to condition (10) causes the lens to become thin, encountering difficulty in making sure of an edge thickness and, hence, lens processing. Being in excess of the upper limit of 0.55 to condition (10) causes an increase in the proportion of the first lens relative to the total length, resulting in an increase in the size of the whole optical system.

Condition (11) is concerned with the thickness and focal length of the second lens. Being short of the lower limit of 0.12 to condition (11) causes the lens to become thin, encountering difficulty in making sure of an edge thickness and, hence, lens processing. Being in excess of the upper limit of 0.24 to condition (11) causes an increase in the proportion of the second lens relative to the total length, resulting in an increase in the size of the whole optical system. This is also not preferable in that there is large field curvature produced.

Further, it is desired to satisfy the following conditions (12) and (13):

$$0.34 < d2/r3 < 1.0 \tag{12}$$

$$0.2 < d3/f < 0.6 \tag{13}$$

where d2 is the thickness of the second lens,
r3 is the radius of curvature of the object-side surface of the second lens,
d3 is a distance from the second lens to a CCD's cover glass, and
f is the focal length of the whole optical system.

Condition (12) is concerned with the thickness of the second lens and the radius of curvature of the object-side surface of the second lens. Being short of the lower limit of 0.34 to condition (12) causes the lens to become thin, encountering difficulty in making sure of an edge thickness and, hence, lens processing. Being in excess of the upper limit of 1.0 to condition (12) causes an increase in the proportion of the second lens relative to the total length, encountering difficulty in making sure the back focus.

Condition (13) is concerned with the distance between the second lens and the CCD's cover glass with respect to the focal length of the whole optical system. With the inventive lens system, focusing is implemented between the second lens and the CCD's cover glass. Here, as the lower limit of 0.2 to condition (13) is not reached, there is a shortage of focusing space that often causes the lens system to be out of focus at the desired distance. Being in excess of the upper limit of 0.6 to condition (13) is not preferable because the total length grows long. It also causes the angle of oblique incidence to become shallow, giving rise to an increase in the diameter of the second lens.

According to the invention, it is possible to provide an objective optical system for endoscopes, which is capable of oblique view and side view without recourse to any member for changing the field-of-view direction, and of small format yet high performance.

Still other objects and advantages of the invention will be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The inventive objective optical system for endoscopes is now explained with reference to Examples 1, 2, 3 and 4, the lens arrangement sections of which are illustrated in FIGS. 1, 2, 3 and 4, respectively.

Throughout FIGS. 1-4, the first lens group is indicated by G1, the second lens group by G2, the stop by S, the prism by P, the protective glass by G, the CCD's cover glass by C1, C2, and the CCD's image plane by I.

Figure 1:
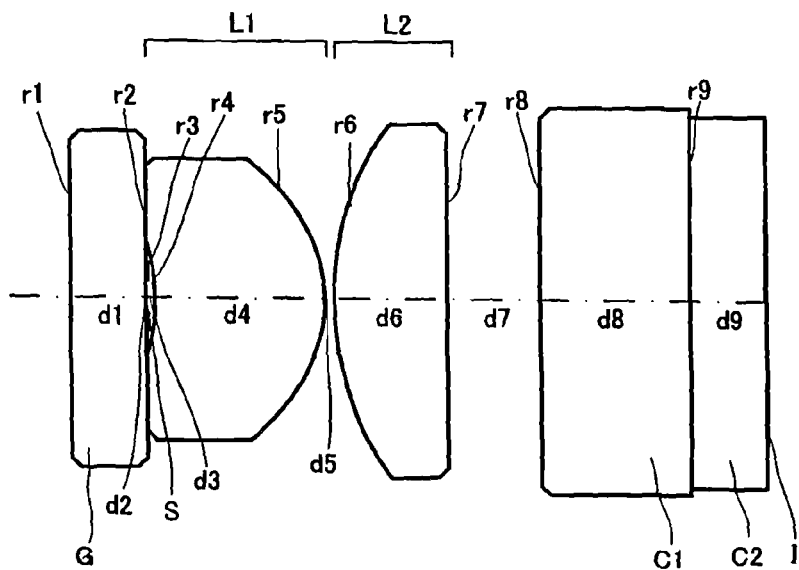
FIG. 1 is illustrative in lens arrangement section of Example 1 of the taking optical system according to the invention.

As shown in FIG. 1, the objective optical system of Example 1 is designed to form an object image on the CCD's image plane I via the protective glass G, the stop S, the first lens L1 of positive refracting power, the second lens L2 of positive refracting power, and the CCD's cover glasses C1, C2 in order from the object side.

The first lens L1 is made up of a positive meniscus lens concave on its object side.

The second lens L2 is made up of a plano-convex positive lens convex on its object side.

Note here that to save the space for receiving an infrared cut filter, the second lens is constructed of an infrared cut filter.

Figure 2:
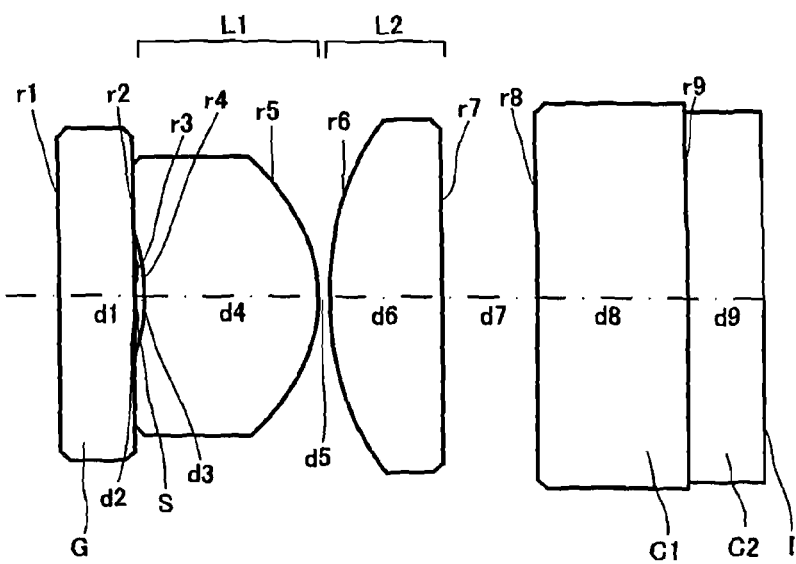
FIG. 2 is illustrative, as in FIG. 1, of Example 2 of the taking optical system according to the invention.

As shown in FIG. 2, the objective optical system of Example 2 is designed to form an object image on the CCD's image plane I via the protective glass G, the stop S, the first lens L1 of positive refracting power, the second lens L2 of positive refracting power, and the CCD's cover glasses C1, C2 in order from the object side.

The first lens L1 is made up of a positive meniscus lens concave on its object side.

The second lens L2 is made up of a plano-convex positive lens convex on its object side.

Note here that to save the space for receiving an infrared cut filter, the second lens is constructed of an infrared cut filter.

Figure 3:
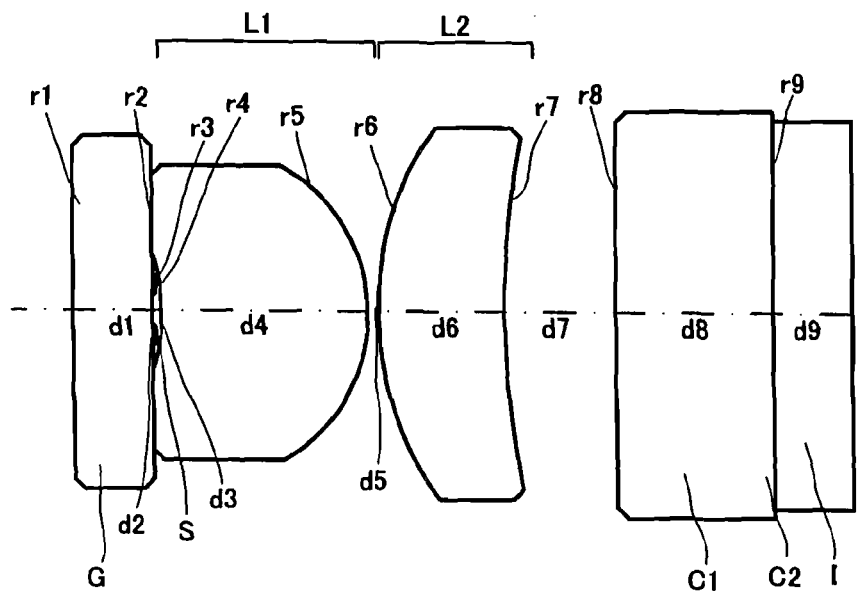
FIG. 3 is illustrative, as in FIG. 1, of Example 3 of the taking optical system according to the invention.

As shown in FIG. 3, the objective optical system of Example 3 is designed to form an object image on the CCD's image plane I via the protective glass G, the stop S, the first lens L1 of positive refracting power, the second lens L2 of positive refracting power, and the CCD's cover glasses C1, C2 in order from the object side.

The first lens L1 is made up of a positive meniscus lens concave on its object side.

The second lens L2 is made up of a positive meniscus lens convex on its object side.

Note here that it is difficult to make sure space for putting away an infrared cut filter, the front surface of the centering CCD's cover glass C1 is provided with an infrared cut coating. That surface may also be provided with coatings for a laser cut filter, a YAG cut filter, a color correction filter and so on depending on the intended purpose.

Figure 4:
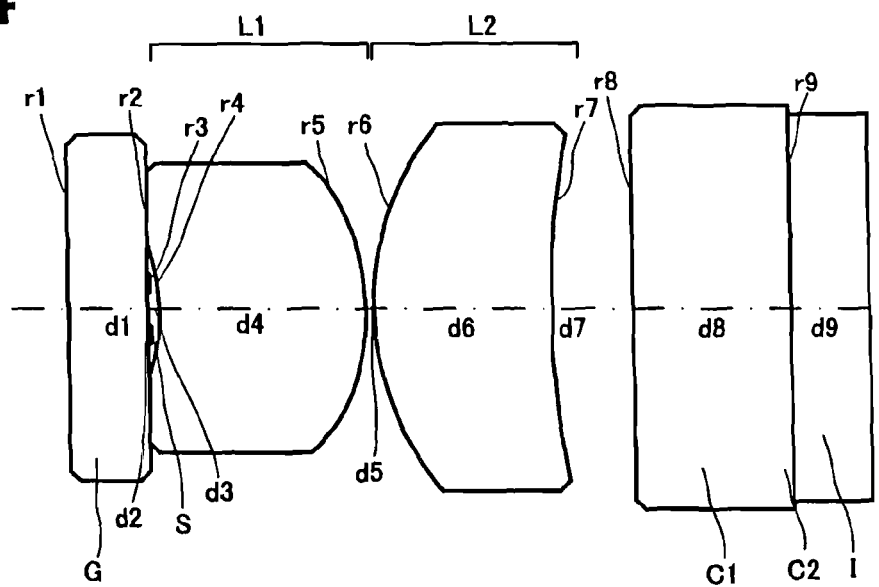
FIG. 4 is illustrative, as in FIG. 1, of Example 4 of the taking optical system according to the invention.
Figure 5:
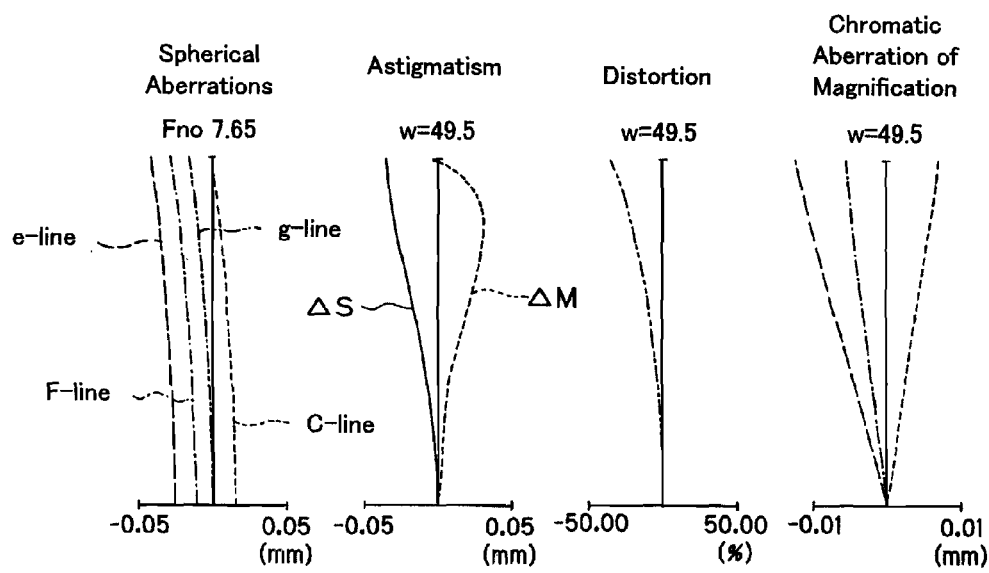
FIG. 5 is an aberration diagram for Example 1.
Figure 6:
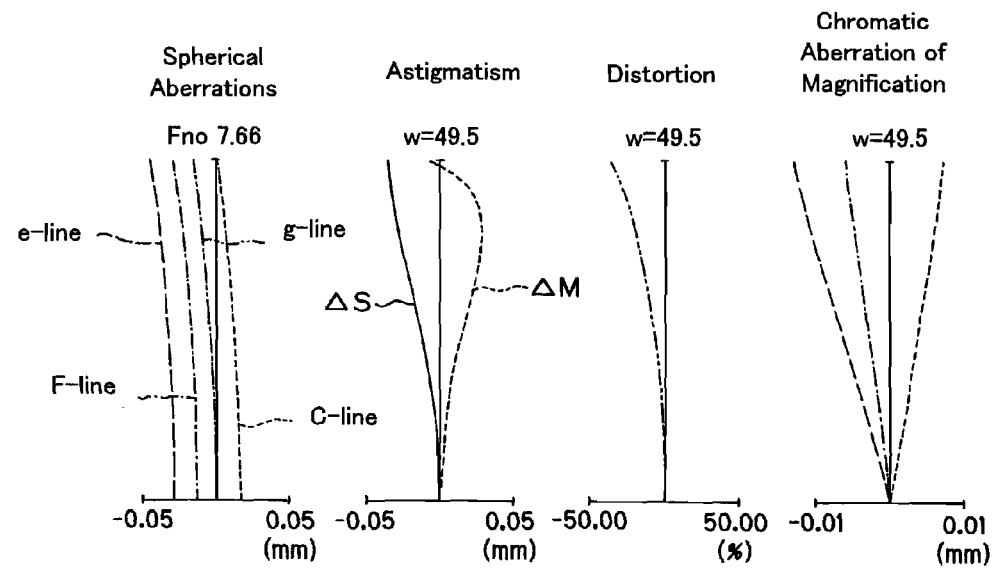
FIG. 6 is an aberration diagram for Example 2.
Figure 7:
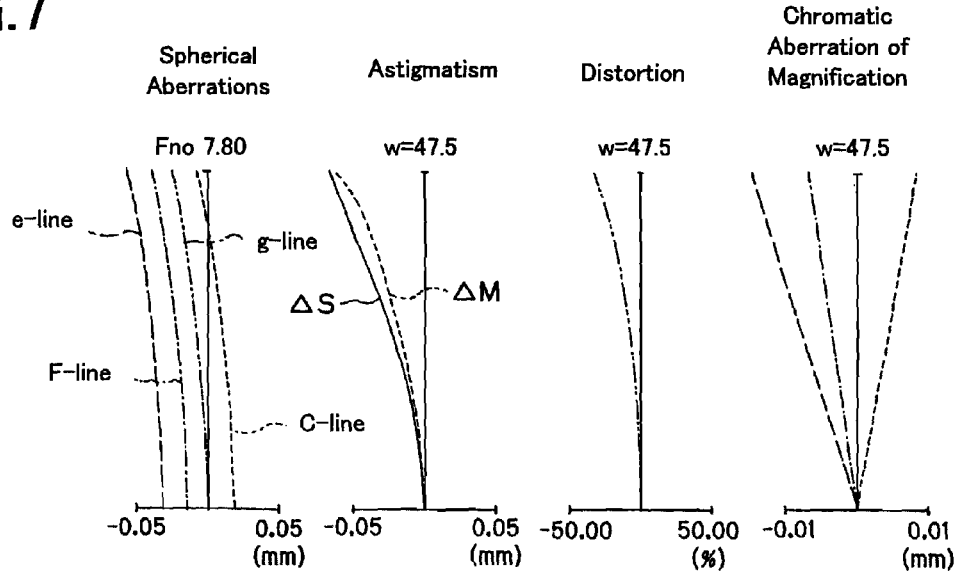
FIG. 7 is an aberration diagram for Example 3.
Figure 8:
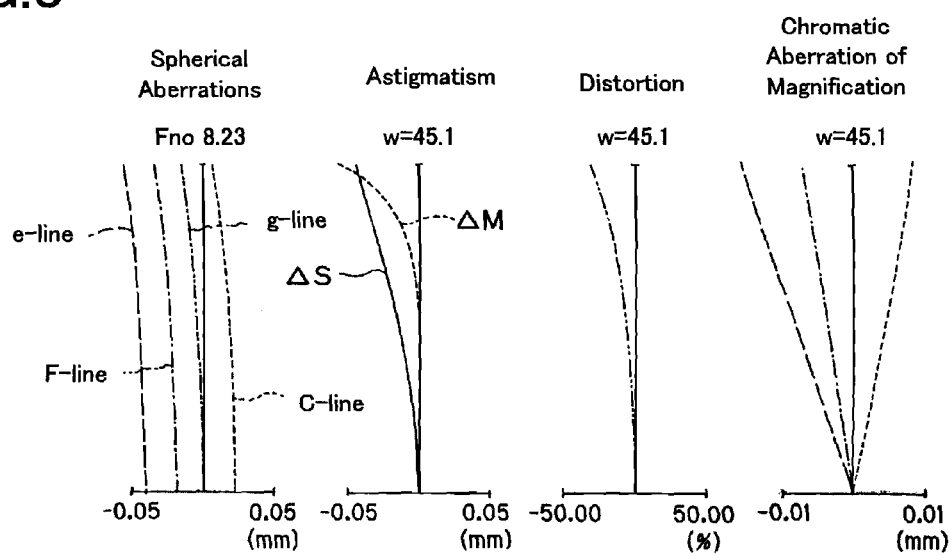
FIG. 8 is an aberration diagram for Example 4.

As shown in FIG. 4, the objective optical system of Example 4 is designed to form an object image on the CCD's image plane I via the protective glass G, the stop S, the first lens L1 of positive refracting power, the second lens L2 of positive refracting power, and the CCD's cover glasses C1, C2 in order from the object side.

The first lens L1 is made up of a positive meniscus lens concave on its object side.

The second lens L2 is made up of a positive meniscus lens convex on its object side.

Note here that it is difficult to make sure space for putting away an infrared cut filter, the front surface of the centering CCD's cover glass C1 is provided with an infrared cut coating. That surface may also be provided with coatings for a laser cut filter, a YAG cut filter, a color correction filter and so on depending on the intended purpose.

Set out below are numerical data on the lenses in the respective examples.

Referring here to the numerical data on the lenses in the respective examples, r is the radius of curvature of each lens surface, d is the thickness or spacing of each lens, ne is the e-line refractive index of each lens, and vd is the d-line Abbe constant of each lens.

Numerical Example 1

Unit mm
Focal Length 1.181
Surface Data

| Surface No. | r | d | ne | vd |
| --- | --- | --- | --- | --- |
| Object Point | ∞ | 11.9000 | | |
| 1 | ∞ | 0.4000 | 1.88815 | 40.76 |
| 2 (Stop) | ∞ | 0.0100 | | |
| 3 | ∞ | 0.0500 | | |
| 4 | −1.1000 | 0.9000 | 1.73234 | 54.68 |
| 5 | −0.9000 | 0.0500 | | |
| 6 | 1.6500 | 0.6000 | 1.51965 | 75.00 |
| 7 | ∞ | 0.5000 | | |
| 8 | ∞ | 0.8000 | 1.51825 | 64.14 |
| 9 | ∞ | 0.4000 | 1.61379 | 50.20 |
| Image Plane | | | | |

Numerical Example 2

Unit mm
Focal Length 1.182
Surface Data

| Surface No. | r | d | ne | vd |
| --- | --- | --- | --- | --- |
| Object Point | ∞ | 11.9000 | | |
| 1 | ∞ | 0.4000 | 1.88815 | 40.76 |
| 2 (Stop) | ∞ | 0.0100 | | |
| 3 | ∞ | 0.0500 | | |
| 4 | −1.1500 | 0.9200 | 1.77621 | 49.60 |
| 5 | −0.9500 | 0.0500 | | |
| 6 | 1.6500 | 0.6000 | 1.51965 | 75.00 |
| 7 | ∞ | 0.5000 | | |
| 8 | ∞ | 0.8000 | 1.51825 | 64.14 |
| 9 | ∞ | 0.4000 | 1.61379 | 50.20 |
| Image Plane | | | | |

Numerical Example 3

Unit mm
Focal Length 1.206
Surface Data

| Surface No. | r | d | ne | vd |
| --- | --- | --- | --- | --- |
| Object Point | ∞ | 11.9000 | | |
| 1 | ∞ | 0.4000 | 1.88815 | 40.76 |
| 2 (Stop) | ∞ | 0.0100 | | |
| 3 | ∞ | 0.0500 | | |
| 4 | −1.0500 | 1.0500 | 1.69979 | 55.53 |
| 5 | −0.8500 | 0.0500 | | |
| 6 | 1.6500 | 0.6500 | 1.51825 | 64.14 |
| 7 | 5.0000 | 0.5600 | | |
| 8 | ∞ | 0.8000 | 1.51825 | 64.14 |
| 10 | ∞ | 0.4000 | 1.61379 | 50.20 |
| Image Plane | | | | |

Numerical Example 4

Unit mm
Focal Length 1.261
Surface Data

| Surface No. | r | d | ne | vd |
|---|---|---|---|---|
| Object Point | ∞ | 11.9000 | | |
| 1 | ∞ | 0.4000 | 1.88815 | 40.76 |
| 2 (Stop) | ∞ | 0.0100 | | |
| 3 | ∞ | 0.0500 | | |
| 4 | −1.3000 | 1.0500 | 1.88815 | 40.76 |
| 5 | −1.0800 | 0.0500 | | |
| 6 | 1.5500 | 0.8800 | 1.48915 | 70.23 |
| 7 | 4.7000 | 0.4200 | | |
| 8 | ∞ | 0.8000 | 1.51825 | 64.14 |
| 9 | ∞ | 0.4000 | 1.61379 | 50.20 |
| Image Plane | | | | |

Aberration diagrams for Examples 1 to 4 are shown in FIGS. 5 to 8. In the aberration diagrams for spherical aberrations and astigmatism, a short-dot line, a long-dot line, a one-dot line and a two-dot line are indicative of the amounts in mm of aberrations with respect to the C-line, e-line, F-line and g-line, respectively. In the astigmatism diagrams, a solid line S and a dot line M are indicative of a sagittal image plane in mm and a meridional image plane in mm. In the distortion diagrams, a two-dot line is indicative of distortion in % with respect to the g-line.

Set out below are the values of conditions (1) to (8) in the respective examples.

| Conditions | Ex. 1 | Ex. 2 | Ex. 3 | Ex. 4 |
|---|---|---|---|---|
| (1) | −0.93 | −0.97 | −0.87 | −1.03 |
| (2) | −0.76 | −0.80 | −0.70 | −0.86 |
| (3) | 2.69 | 2.69 | 3.69 | 3.43 |
| (4) | 1.729 | 1.772 | 1.697 | 1.883 |
| (5) | 1.40 | 1.40 | 1.37 | 1.23 |
| (6) | 4.07 | 4.12 | 4.34 | 4.45 |
| (7) | 20.32 | 25.40 | 8.61 | 29.47 |
| (8) | 99.1 | 98.9 | 95.0 | 90.3 |
| (9) | 1.36 | 1.36 | 2.21 | 1.96 |
| (10) | 0.39 | 0.39 | 0.52 | 0.47 |
| (11) | 0.19 | 0.19 | 0.15 | 0.2 |
| (12) | 0.36 | 0.36 | 0.39 | 0.57 |
| (13) | 0.42 | 0.42 | 0.46 | 0.33 |

The aforesaid inventive objective optical system for endoscopes, for instance, may be set up as follows.

[1] An objective optical system for endoscopes, characterized by comprising, in order from its object side, a stop, a first lens and a second lens, wherein the first lens comprises a positive meniscus lens concave on its object side and the second lens comprises a positive lens convex on its object side, with the satisfaction of the following conditions (1), (2), (3) and (4):

$$-1.2 < r1/f < -0.8 \quad (1)$$

$$-1.0 < r2/f < -0.6 \quad (2)$$

$$2.1 < f2/f < 4.2 \quad (3)$$

$$nd1 > 1.65 \quad (4)$$

where r1 is the radius of curvature of the object-side surface of the first lens, r2 is the radius of curvature of the image-side surface of the first lens, f is the focal length of the whole optical system, f2 is the focal length of the second lens, and nd1 is the d-line refractive index of the first lens.

[2] An objective optical system for endoscopes, as recited in [1] above, characterized by being located almost vertically to the direction of insertion of an end of the endoscope.

[3] An objective optical system for endoscopes, as recited in [1] or [2] above, characterized by satisfying the following conditions (5), (6), (7) and (8):

$$1.0 < r3/f < 1.8 \quad (5)$$

$$3.2 < lt/ih < 5.2 \quad (6)$$

$$5 < |v2-v1| < 35 \quad (7)$$

$$2w > 85° \quad (8)$$

where r3 is the radius of curvature of the object-side surface of the second lens, lt is the total lens length (from the first surface to an imaging plane), ih is the maximum image height, v1 is the Abbe constant of the first lens, v2 is the Abbe constant of the second lens, and 2w is the maximum angle of view.

[4] An objective optical system for endoscopes, as recited in any one of [1] to [3] above, characterized by satisfying the following conditions (9), (10) and (11):

$$1.3 < f2/f1 < 2.5 \quad (9)$$

$$0.37 < d1/f1 < 0.55 \quad (10)$$

$$0.12 < d2/f2 < 0.24 \quad (11)$$

where f1 is the focal length of the first lens, d1 is the thickness of the first lens, d2 is the thickness of the second lens, and f2 is the focal length of the second lens.

[5] An objective optical system for endoscopes, as recited in any one of [1] to [4] above, characterized by satisfying the following conditions (12) and (13):

$$0.34 < d2/r3 < 1.0 \quad (12)$$

$$0.2 < d3/f < 0.6 \quad (13)$$

where d2 is the thickness of the second lens, r3 is the radius of curvature of the object-side surface of the second lens, d3 is a distance from the second lens to a CCD's cover glass, and f is the focal length of the whole optical system.

Figure 9:
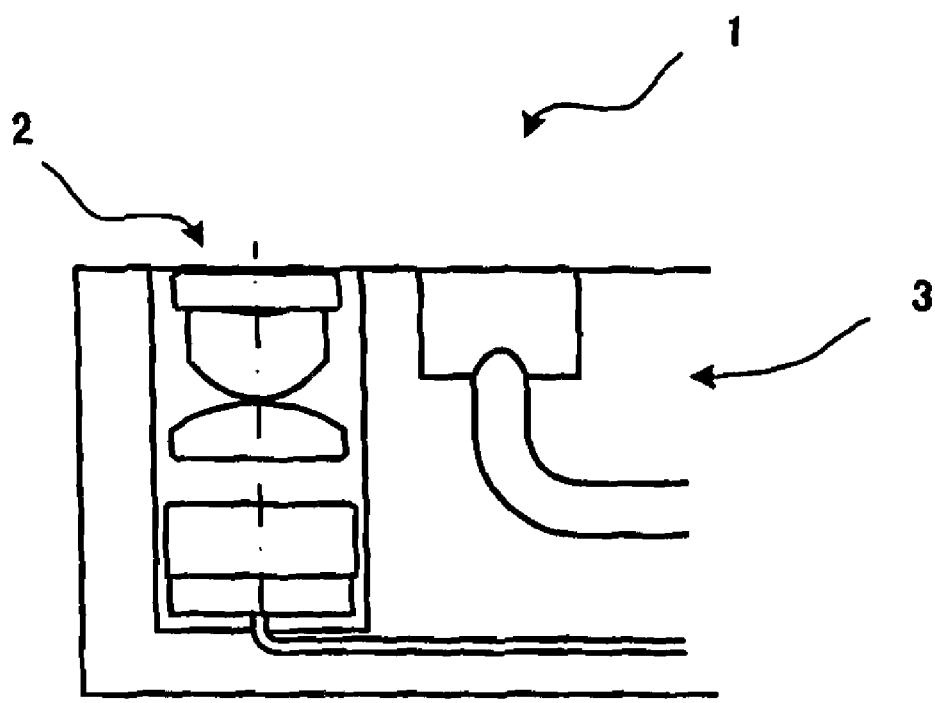
FIG. 9 is illustrative in schematic of the scope end of an oblique view type endoscope having the inventive objective optical system for endoscopes.

FIG. 9 is illustrative in schematic of the scope end of an oblique view type endoscope having the inventive objective optical system for endoscopes. An endoscope 1 according to the invention has an objective optical system 2 for endoscopes located on a side of its end portion. An illumination optical system 3 is located on a side of the endoscope 1 near the objective optical system 2 for endoscopes.

With such arrangement, the object to be examined is irradiated with light from the illumination optical system 3, and reflected light from that object transmits through the objective optical system 2 for imaging on a CCD. Thereafter, the imaged light is converted into electric or image signals, and shown on a monitor for examination of the object.

What is claimed is:

1. An objective optical system for endoscopes, characterized by comprising, in order from its object side, a stop, a first lens and a second lens, wherein the first lens comprises a positive meniscus lens concave on its object side and the second lens comprises a positive lens convex on its object side, with satisfaction of the following conditions (1), (2), (3) and (4):

$$-1.2 < r1/f < -0.8 \quad (1)$$

$$-1.0 < r2/f < -0.6 \quad (2)$$

$$2.1 < f2/f < 4.2 \quad (3)$$

$$nd1 > 1.65 \quad (4)$$

where r1 is a radius of curvature of an object-side surface of the first lens,
r2 is a radius of curvature of an image-side surface of the first lens,
f is a focal length of the whole optical system,
f2 is a focal length of the second lens, and
nd1 is a d-line refractive index of the first lens.

2. The objective optical system for endoscopes according to claim 1, characterized by being located substantially vertically to a direction of insertion of an end of the endoscope.

3. The objective optical system for endoscopes according to claim 1, characterized by satisfying the following conditions (5), (6), (7) and (8):

$$1.0 < r3/f < 1.8 \quad (5)$$

$$3.2 < lt/ih < 5.2 \quad (6)$$

$$5 < |v2-v1| < 35 \quad (7)$$

$$2w > 85° \quad (8)$$

where r3 is a radius of curvature of an object-side surface of the second lens,
lt is a total lens length (from a first surface to an imaging plane),
ih is a maximum image height,
v1 is an Abbe constant of the first lens,
v2 is an Abbe constant of the second lens, and
2w is a maximum angle of view.

4. The objective optical system for endoscopes according to claim 1, characterized by satisfying the following conditions (9), (10) and (11):

$$1.3 < f2/f1 < 2.5 \quad (9)$$

$$0.37 < d1/f1 < 0.55 \quad (10)$$

$$0.12 < d2/f2 < 0.24 \quad (11)$$

where f1 is a focal length of the first lens,
d1 is a thickness of the first lens,
d2 is a thickness of the second lens, and
f2 is a focal length of the second lens.

5. The objective optical system for endoscopes according to claim 1, characterized by satisfying the following conditions (12) and (13):

$$0.34 < d2/r3 < 1.0 \quad (12)$$

$$0.2 < d3/f < 0.6 \quad (13)$$

where d2 is a thickness of the second lens,
r3 is a radius of curvature of an object-side surface of the second lens,
d3 is a distance from the second lens to a CCD's cover glass, and
f is a focal length of the whole optical system.

* * * * *